United States Patent
Sasamoto et al.

(10) Patent No.: US 6,772,286 B2
(45) Date of Patent: Aug. 3, 2004

(54) METHOD FOR REGENERATING DATA IN DISK ARRAY

(75) Inventors: Kyoichi Sasamoto, Tama (JP); Masayuki Takakuwa, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 09/931,012

(22) Filed: Aug. 17, 2001

(65) Prior Publication Data

US 2002/0073279 A1 Jun. 13, 2002

(30) Foreign Application Priority Data

Dec. 8, 2000 (JP) ........................................ 2000-374616

(51) Int. Cl.[7] .............................................. G06F 12/00
(52) U.S. Cl. ........................ 711/114; 711/111; 711/112; 711/113
(58) Field of Search ................................ 711/112, 113, 711/114, 111

(56) References Cited

U.S. PATENT DOCUMENTS 5,333,305 A * 7/1994 Neufeld ......................... 714/5
5,860,090 A * 1/1999 Clark ........................... 711/113

FOREIGN PATENT DOCUMENTS

JP 11-24849 1/1999

* cited by examiner

Primary Examiner—Donald Sparks
Assistant Examiner—Ngoc Dinh
(74) Attorney, Agent, or Firm—Finnegan, Henderson, Farabow, Garrett, & Dunner, L.L.P.

(57) ABSTRACT

If one of the HDDs of a disk array fails, a disk array controller regenerates the data stored in the failed HDD and stores the regenerated data in another HDD used in place of the failed HDD. To be more specific, the disk array controller checks each of the stripes of the disk areas of the disk array and determines whether each stripe is used by a file system. This determination is based on a disk resource management table. Then, the disk array controller regenerates data by use of RAID technology only for a stripe that has been determined as being used by the file system.

8 Claims, 12 Drawing Sheets

90

| LOGICAL BLOCK SIZE | ~91 |
| --- | --- |
| LOGICAL BLOCK NUMBER Na | ~92 |
| LOGICAL BLOCK NUMBER Nb | ~92 |
| LOGICAL BLOCK NUMBER Nc | ~92 |
| LOGICAL BLOCK NUMBER Nd | ~92 |
| ⋮ | |

F I G. 9

100

| STRIPE NUMBER Na | ~101 |
| --- | --- |
| STRIPE NUMBER Nb | ~101 |
| STRIPE NUMBER Nc | ~101 |
| STRIPE NUMBER Nd | ~101 |
| ⋮ | |

F I G. 10

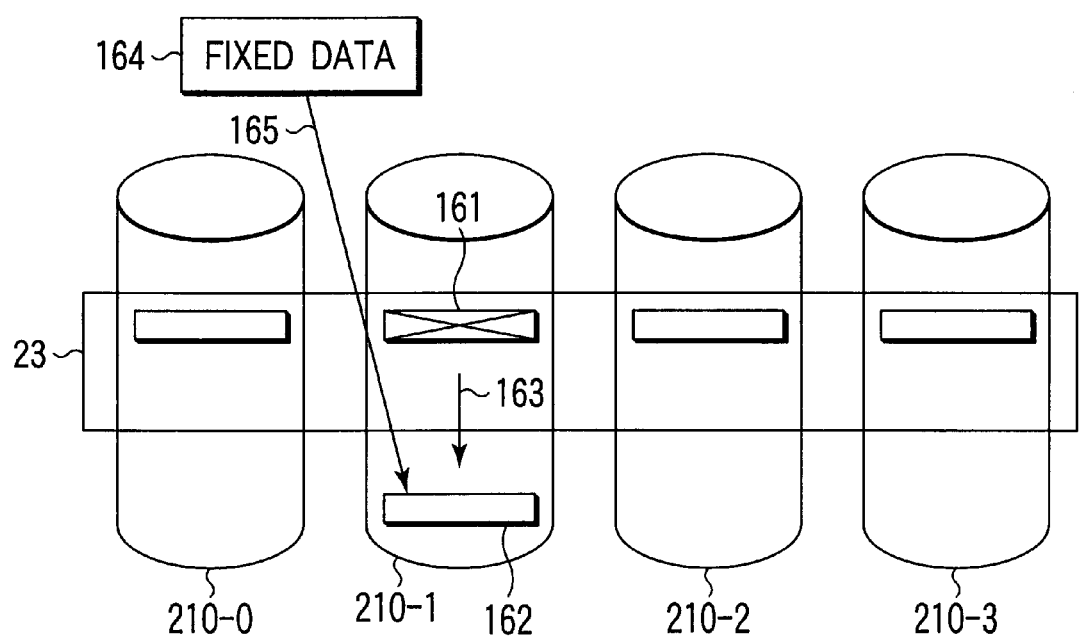
F I G. 16

METHOD FOR REGENERATING DATA IN DISK ARRAY

CROSS-REFERENCE TO RELATED APPLICATIONS

This application is based upon and claims the benefit of priority from the prior Japanese Patent Application No. 2000-374616, filed Dec. 8, 2000, the entire contents of which are incorporated herein by reference.

BACKGROUND OF THE INVENTION

The present invention relates to a disk array system of a RAID structure (RAID: Redundant Arrays of Inexpensive Disks). More specifically, the present invention relates to a method which regenerates data stored in a disk array and which is suitable for use if a disk drive, i.e., a member of the disk array, fails.

In general, a disk array system comprises: a disk array made up of a number of disk drives, such as magnetic disk drives (hereinafter referred to as "HDD"); and a disk array controller for controlling access executed for each HDD of the disk array. The disk array system is used as an external storage device and has the following two features. The first feature is that the HDDs of the disk array are driven in parallel to execute a read-out/write-in operation in a distributed manner. This feature is intended to speed up an accessing operation. The second feature is related to data redundancy technology and is intended to ensure a reliable operation.

Upon the reception of write data transferred from a host computer, the disk array controller generates redundancy data, which serves as data correction information. Then, the disk array controller writes the redundancy data in one of the HDDs of the disk array. Even if one of the HDDs fails, the data stored in that HDD can be regenerated, using the redundancy data and the data stored in the other normal HDDs.

RAID technology is known as one of data redundancy techniques. RAID technology is divided into a variety of RAID levels in relation to RAID data and redundancy data. Typical RAID levels are level 3 and level 5.

According to level 3 (RAID level 3), the disk array controller divides updating data (write data) transferred from the host computer into sections, and executes an exclusive-OR operation between the divided sections of the updating data, thereby generating parity data, which is redundancy data. On the basis of this parity data, the disk array controller updates the original parity data stored in one of the HDDs. According to level 5 (RAID level 5), on the other hand, the disk array controller generates updated parity data (new parity data) by executing an exclusive-OR operation between the following three: updating data (new data) transferred from the host computer; to-be-updated data (old data) stored in an HDD area in which the updating data is to be stored; and to-be-updated parity data (old parity data) stored in another HDD area corresponding to the HDD area in which the updating data is to be stored. The disk array controller updates the original parity data, using the new parity data generated as above.

If a member HDD of the disk array fails, the disk array system of the above RAID structure regenerates data in that member HDD by executing the following procedures: First of all, the disk array controller reads data out from the HDDs other than the failed HDD. This readout operation is executed in units of one stripe, based on which the disk areas of the disk array are managed. Then, the disk array controller executes an exclusive-OR operation between the data read out from the HDDs, thereby acquiring regenerated (restored) data. The technique based on the exclusive-OR operation, namely, the technique including a data restoring technique that utilizes the matching between RAID data and parity data (redundancy data), is none other than RAID technology. Using this RAID technology, the disk array controller acquires regenerated data in units of one stripe and stores the resultant data in the HDD that is used in place of the failed HDD. The HDD used in place of the failed HDD is an HDD with which the failed HDD is reassigned; alternatively, it is a spare HDD connected to the disk array controller and assigned as an HDD replacing the failed HDD.

In the manner described above, the disk array system of the RAID structure enables regeneration of the data stored in a member HDD of the disk array even if that member HDD fails. However, the conventional disk array system regenerates data stored in all areas of the failed HDD. Since recent HDDs have an increased storage capacity, the conventional disk array system has problems in that the regeneration of data takes a lot of time.

When data regeneration is being executed, data redundancy, which is a feature of the RAID technology, may not be maintained. It follows from this that the long time required for data regeneration can lead to the failure of another HDD. If the second failure occurs, data cannot be regenerated and may be lost. To regenerate data stored in a failed HDD, it is necessary to read out data from all areas of the other HDDs. If a media trouble (a partial HDD trouble) occurs in one of the HDDs from which the data is read out, the HDDs undergo multi-failure, and data cannot be regenerated any longer. Since this gives rise to the situation wherein the entire disk array completely fails (i.e., the situation wherein data in the disk array cannot be accessed) or the situation wherein the data regeneration processing cannot be continued, the reliability of the disk array system is affected.

The disk array system reads out data from an HDD for inspection at regular intervals. Conventionally, this media inspection is intended to detect a media defect of an HDD (i.e., a sector block trouble or other partial troubles of the HDD) at an early stage and is performed for all areas of the HDD. Like the regeneration of the data stored in the failed HDD, therefore, the media inspection performed by the conventional disk array system takes a lot of time, and the reliability of the disk array system is affected.

BRIEF SUMMARY OF THE INVENTION

The present invention has been conceived in consideration of the above circumstances, and is intended to improve the reliability of a disk array system by dividing the disk areas of a disk array into areas actually used by the file system of a host computer and areas not used thereby.

To achieve the above object, the first aspect of the present invention provides a method for regenerating data stored in a disk array, which determines the type of stripe if one of the disk drives of a disk array fails. Specifically, the method checks each of the stripes included in the disk areas of the disk array and determines whether each stripe is a first stripe that has a logical block used by the file system of a host computer or a second stripe that does not have a logical block used by the file system. Data is generated by the RAID technology, using only the stripes that have been determined as first stripes.

In the manner described above, the data of the failed disk drive is regenerated, using only the areas actually used by the file system. Hence, the processing time needed for data regeneration can be shortened, accordingly. Since the stripes not used by the file system do not contain effective data to be regenerated, the RAID technology does not use such stripes for data regeneration. The processing time needed for the regeneration of data can be as short as possible. As a result, the probability of multi-failure of the disk drives is reduced, and the risk of a fatal phenomenon, such as the complete failure of the disk array, can be reduced.

The second aspect of the present invention provides a method for regenerating data stored in a disk array, which reads out data from the disk drives of the disk array and detects a local defect in the disk drives. At the time of this media inspection, the method checks each of the stripes included in the disk areas of the disk array and determines whether each stripe is a first stripe or a second stripe. Media inspection, including the operation of reading out data from the disk drive, is executed with respect to only the stripes that have been determined as first stripes. If a defect is detected in this media inspection, the RAID technology regenerates data representing the location where the defect is detected.

In the manner described above, only the stripes used in the file system are extracted for media inspection. Hence, the processing time needed for this inspection can be shortened. Since the shortened media inspection time leads to early detection of a media defect, the reliability of the disk drives is improved. As a result, the reliability of the disk array system is also improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 shows an example of a data structure of the disk resource management information list which the host computer 10 transmits to the disk array system 20.

FIG. 10 shows a modification of the disk resource management information list.

FIG. 16 illustrates how data is generated when a defective sector block is detected in the media inspection whose flowchart is shown in FIG. 15.

DETAILED DESCRIPTION OF THE INVENTION

Embodiments of the present invention will now be described with reference to the accompanying drawings.

Figure 1:
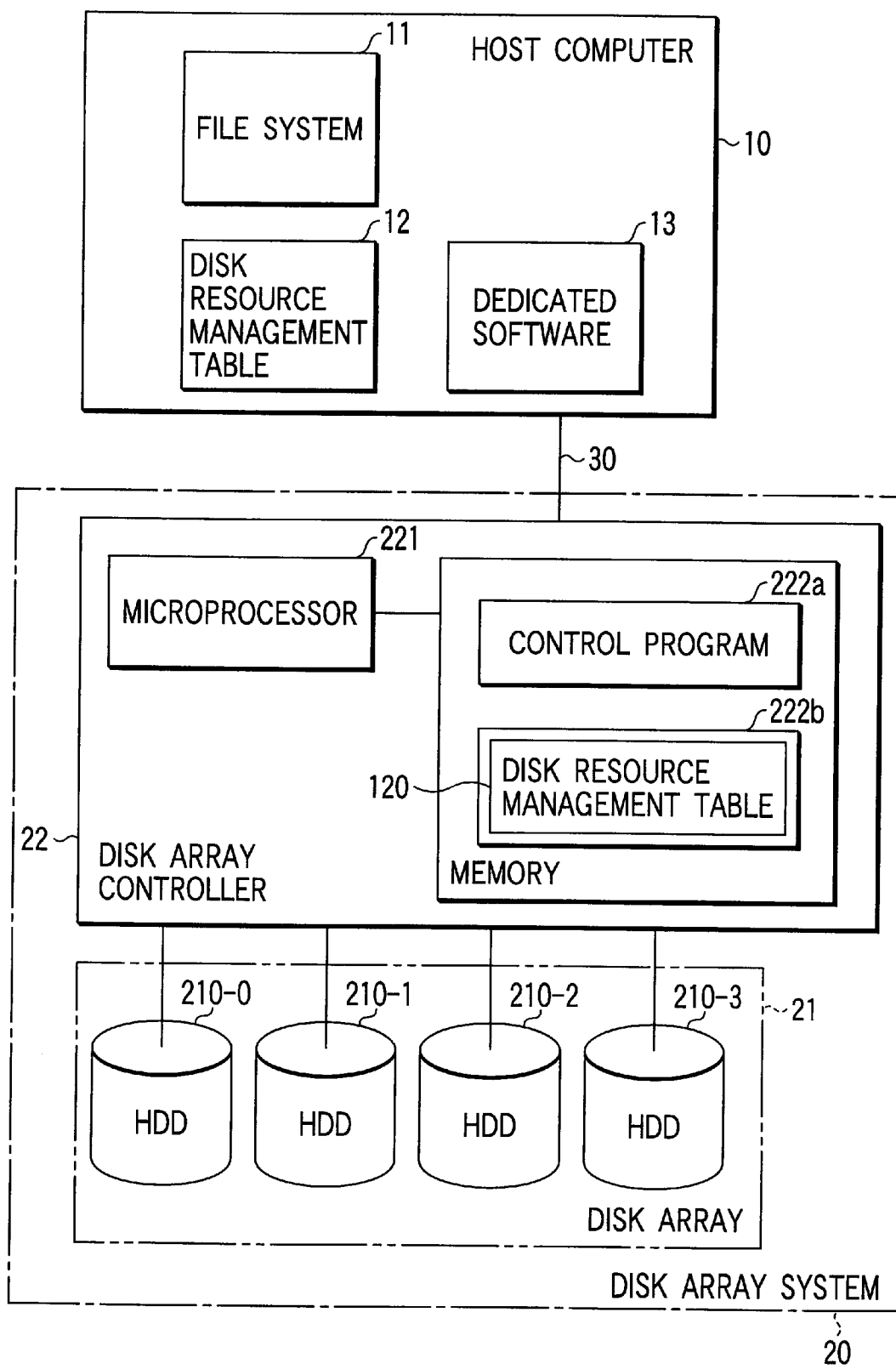
FIG. 1 is a block diagram showing a computer system employing a disk array system 20 according to one embodiment of the present invention.

FIG. 1 is a block diagram showing a computer system employing a disk array system according to one embodiment of the present invention. The computer system shown in FIG. 1 comprises a host computer 10, and a disk array system 20 used by the host computer 10. The host computer 10 and the disk array system 20 are connected together by a host interface 30.

The host computer 10 is provided with a file system 11 and a disk resource management table 12. The file system 11 is part of the functions provided by an OS (operating system), and manages files stored in disk areas of the disk array system 20. The disk resource management table 12 contains a group of entries indicating whether logical blocks are used by the file system 11. The disk resource management table 12 contains information on all logical blocks of the disk areas of the disk array system 20. A logical block is a fixed-length block made up of consecutive physical sector blocks. The logical block stores effective data when it is referred to as "being used." The disk resource management table 12 is stored in a storage device of the host computer 10. For example, the table is stored in an HDD (not shown). The disk resource management table 12 may be stored in the disk array system 20. The disk resource management table 12 may indicate whether physical sector blocks are used by the file system 11. In this case, the disk resource management table 12 contains information on all physical sector blocks of the disk areas of the disk array system 20.

Dedicated software 13 is installed in the storage device of the host computer 10. On the basis of this software 13, information on the disk resource management table 12 is acquired from the file system 11 at predetermined timings, the acquired information on the table 12 is used for generating a disk resource management information list 90 (FIG. 9), and the list 90 is transmitted to the disk array system 20. As will be described later, the disk resource management information list 90 is defined as a set of logical block numbers serving as block ID information, and this list contains information on all logical blocks used by the file system 11.

The disk array system 20 comprises a disk array 21 and a disk array controller 22. The disk array 21 is made up of a plurality of disk drives connected to the disk array controller 22. For example, the disk array 21 is made up of four HDDS (magnetic disk drives) 210-0 to 210-3. A spare HDD (not shown) is also connected to the disk array controller 22. The spare HDD is allocated as a backup disk if one of the HDDs 210-0 to 210-3 fails.

The disk array controller 22 controls access to the HDDS 210-0 to 210-3 of the disk array 21. The disk array controller 22 includes a microprocessor 221 and a memory 222. The microprocessor 221 constitutes the main control section of the controller 22 and controls the entirety of the disk array controller 22 and the disk array 21. The memory 222 stores a control program 222a which the microprocessor 221 executes. The memory 222 is provided with a disk resource management table area 222b. This disk resource management table area 222b is used for storing a disk resource management table 120 (FIG. 3B), which is prepared on the basis of the disk resource management information list 90 transmitted from the host computer 10.

In connection with the present embodiment, let us assume that the disk array system 20 is used on RAID5 level. In this case, each of the HDDs 210-0 to 210-3 serves as a data/parity disk; it is used for storing data and parity data (redundancy data). In the case where the disk array system 20 is used on RAID3 level, three of the HDDs 210-0 to 210-3 are used for storing data (data disks), and the remaining one HDD is used for storing parity data (a parity disk).

Figures 2, 3A, 3B:
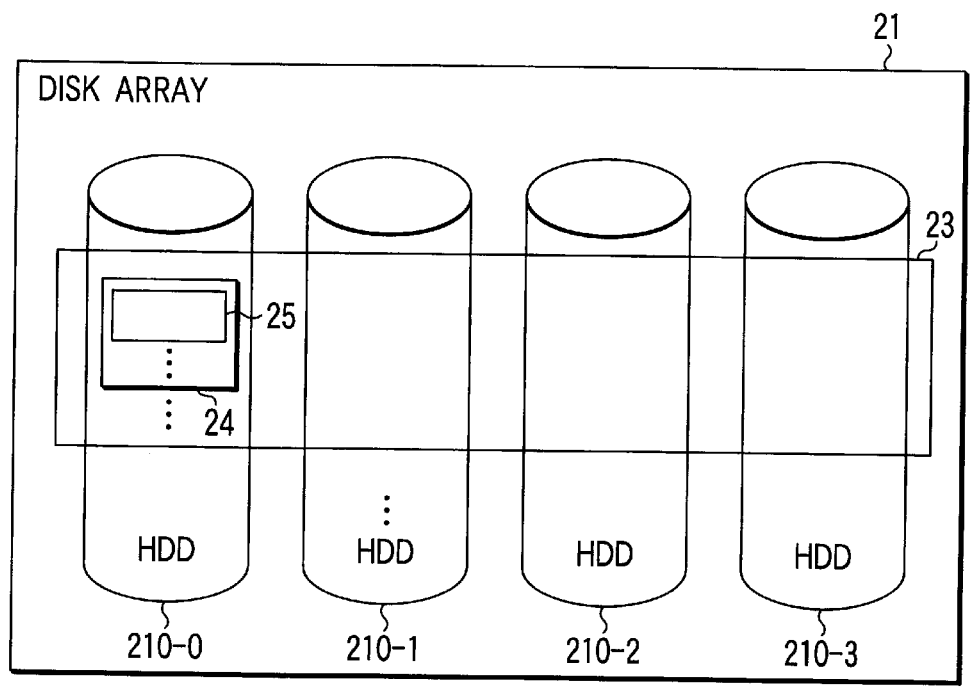
FIG. 2 illustrates the relationships between a stripe, a logical block and a sector block, the relationships being used for managing the disk areas of a disk array 21.
FIG. 3A shows an example of a data structure of a disk resource management table 12 provided in a host computer 10.
FIG. 3B shows an example of a data structure of a disk resource management table 120 stored in a memory of a disk array controller 22.

The disk array controller 22 of the disk array system 20 manages disk areas of the disk array 21, which are areas of the HDDs 210-0 to 210-3, by dividing them into a plurality of stripes 23, as shown in FIG. 2. In general, the size of the stripe ranges from 64 to 256 Kbytes (kilobytes) for each HDD. Each stripe 23 is made of at least one logical block 24. The logical block 24 is a minimum unit based on which the file system 11 of the host computer 10 manages the disk areas of the disk array system 20. In other words, the disk areas of the disk array system 20 are managed in such a manner that they are managed on the basis of the stripes by the disk array system 20 but are managed by on the basis of the logical blocks 24 by the host computer 10. Normally, one logical block has a size ranging from 1 to 8 Kbytes or so and is constituted by a plurality of consecutive physical sector blocks 25. In general, the size of one sector block 25 is 512 bytes.

FIG. 3A shows an example of a data structure of a disk resource management table 12 provided in a host computer 10. The table 12 has entry numbers, which are determined by an order in which entries are physically arranged, and the entry numbers are logical block numbers. Each of the entries of the table 12 has a flag, and this flag indicates whether or not the logical block designated by the logical block number peculiar to the corresponding entry is used by the file system 11. Each of the entries of the table 12 may define a pair made up of a logical block number and a flag.

FIG. 3B shows an example of a data structure of a disk resource management table 120 stored in the disk resource management table area 222b of the disk array controller 22. The table 120 has entry numbers, which are determined by an order in which entries are physically arranged, and the entry numbers are stripe numbers. Each of the entries of the table 120 has a flag, and this flag indicates whether or not the stripe designated by the stripe number peculiar to the corresponding entry is used by the file system 11. In the present embodiment, where at least one of the logical blocks included in a stripe is used by the file system, that stripe is determined as being used by the file system 11. Each of the entries of the table 120 may define a pair made up of a stripe number and a flag.

A description will now be given of the operations the computer system of the structure shown in FIG. 1 performs. The operations will be described, referring to the following cases: (1) the case where the host computer 10 transmits the disk resource management information list 90 to the disk array system 20; (2) the case where the host computer 10 transmits the data write request to the disk array system 20; (3) the case where the disk array system 20 performs data regeneration processing; and (4) the case where the disk array system 20 executes media inspection processing. The processing the disk array system executes in the cases (1) to (4) above is based on the control program 222a, which is executed by the microprocessor 221 of the disk array controller 22 of the disk array system 20.

Figure 4:
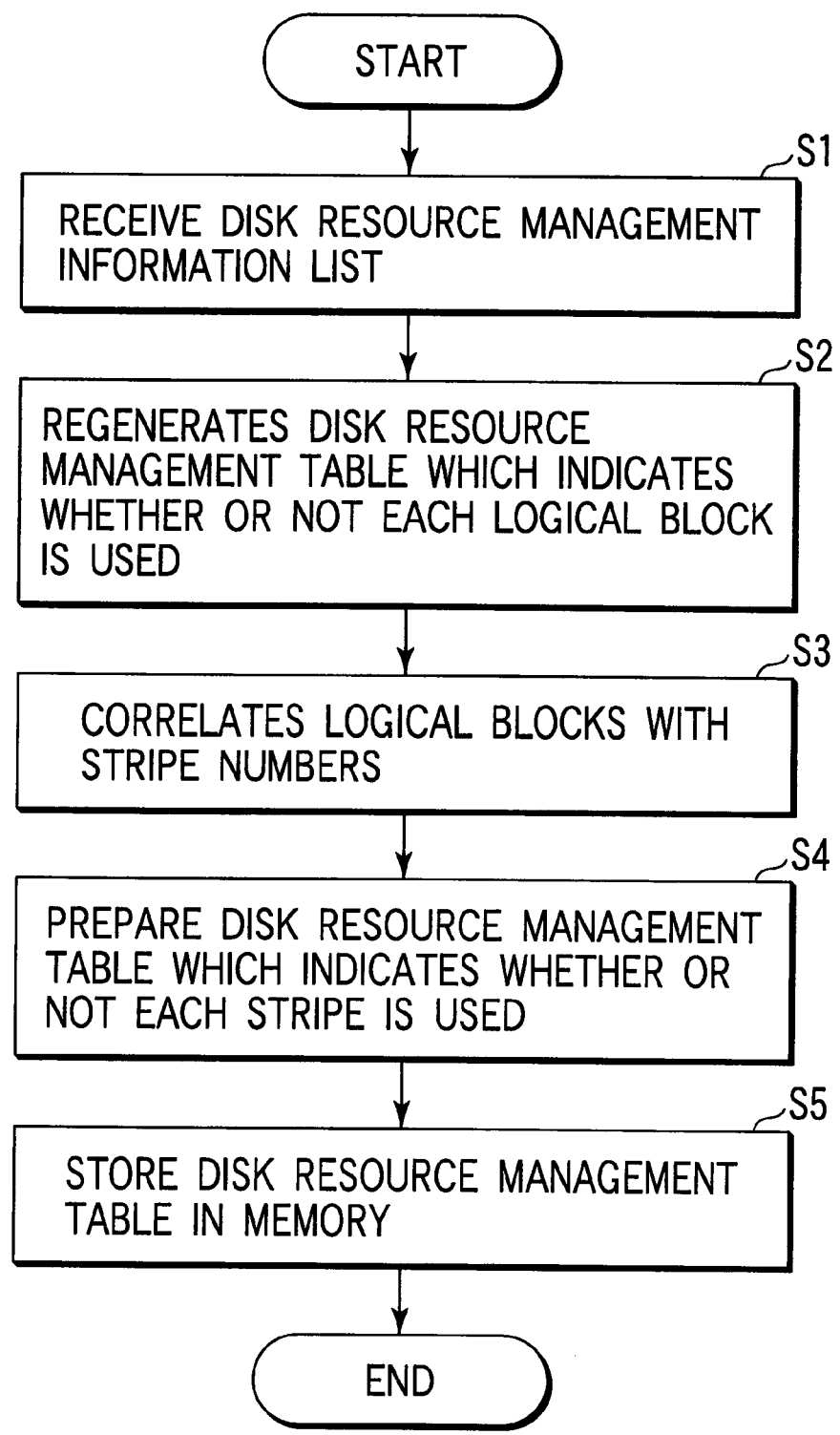
FIG. 4 is a flowchart showing the processing procedures that are followed when the host computer 10 transmits a disk resource management information list to the disk array system 20.

(1) First of all, the processing executed when the host computer 10 transmits the disk resource management information list 90 to the disk array system 20 will be described, referring to the flowchart in FIG. 4.

The host computer 10 acquires the disk resource management table 12 from the file system 11 on the basis of the dedicated software 13 installed in the computer 10. The table 12 held in the computer 10 is acquired at predetermined timings. Based on the disk resource management table 12, the host computer 10 prepares the disk resource management information list 90 shown in FIG. 9 and transmits that list to disk array system 20. To prevent the disk resource management table 12 from varying during the transmission of the disk resource management information list 90, certain measures for prohibiting the updating of files are preferably taken. There may be case where the disk resource management information list 90 is extremely large in size. In such a case, the transmission of the list requires a long time. To prevent adverse effects on the efficiency of the host computer 10, the disk resource management information list 90 is preferably transmitted when the host computer 10 is booted or at predetermined intervals at night when the load on the host computer 10 is comparatively light.

As shown in FIG. 9, the disk resource management information list 90 transmitted from the host computer 10 to the disk array system 20 includes a logical block size 91 and a group of logical block numbers 92. The logical block size 91 represents the size of a logical block 24 used when the file system 11 of the host computer 10 accesses the disk areas (disk volume) of the disk array system 20. The logical block numbers 92 represents logical blocks 24 which are included in the logical blocks 24 of the disk areas and which are used by the file system 11. In other words, the list 90 does not contain information (logical block numbers) on the logical blocks 24 that are not used by the file system 11. The list 90 can be reduced in size, so that the time required for transmitting it from the host computer 10 to the disk array system 20 can be shortened, accordingly. Normally, the areas used by the file system 11 do not account for a great percentage of the disk areas of the disk array system. In such a case, the list 90 should preferably exclude information on the logical blocks 24 that are not used by the file system 11, since exclusion of such information contributes to a short transmission time of the list 90. It should be noted that the disk resource management table 12 may be transmitted from the host computer 10 to the disk array system 20. Between the disk resource management information list 90 and the disk resource management table 120, that one which is smaller in data amount may be transmitted. In this case, information for identifying what is transmitted (the list 90 or the table 120) may be additionally transmitted.

When the host computer 10 transmits the disk resource management list 90, this list 90 is received by the disk array controller 22 of the disk array system 20 (Step S1). Upon receipt of this list 90, the disk array controller 22 regenerates the disk resource management table 12 (FIG. 3) held by the host computer 10, referring to all logical block numbers contained in the disk resource management information list 90 (Step S2). To be more specific, on the basis of the disk resource management information list 90, the disk array controller 22 identifies the logical block numbers of the logical blocks not used by the file system 11. Based on the results of this identification, the disk array controller 22 regenerates the disk resource management table 12. This disk resource management table 12 contains entries indicating whether logical blocks are used, and the information contained in the disk resource management table 12 pertains to all logical blocks of the disk areas of the disk array system 20. The entries are arranged, for example, in the ascending order of the logical block numbers of the blocks.

Next, the disk array controller 22 correlates the logical block numbers managed by the host computer 10 with the stripe numbers managed by the disk array system 20 (Step S3). This correlation is executed as follows. First, the disk array controller 22 calculates the "number of logical blocks per stripe" on the basis of the "stripe size" the disk array controller 22 manages and the logical block size 91 contained in the disk resource management information list 90 transmitted from the host computer 10. The calculation is based on the following formula:

"the number of logical blocks per stripe"="stripe size"/"logical block size"

Subsequently, the disk array controller 22 calculates a "stripe number" on the basis of each "logical block number" and the "number of logical blocks per stripe." The stripe number represents a stripe 23 in which the logical block 24 indicated by the "logical block number" is included. The calculation is based on the following formula:

"stripe number"=integer portion of ("logical block number"/"number of logical blocks per stripe")

Given that the "number of logical blocks per stripe" is "4", the "stripe numbers" of the stripes containing the logical blocks whose "logical block numbers" are "0" to "3" are all "0." In this manner, the logical block numbers managed by the host computer 10 are correlated with the stripe numbers managed by the disk array system 20.

After the correlation between the logical block numbers and the stripe numbers, the disk array controller 22 prepares the disk resource management table 120 shown in FIG. 3B, referring to results of correlation and the regenerated disk resource management table 12 (Step S4). This table 120 contains entries indicating whether or not the corresponding stripes are used by the file system 11. The information covered by the entries pertains to all stripes of the disk array system 20, and the entries are arranged in the ascending order of the stripe numbers of the corresponding stripes. In the present embodiment, where a stripe includes even one logical block that is used by the file system, then that stripe is determined as being used by the file system 11. A flag indicating the "being used" state is set in the corresponding entry. On the other hand, where a stripe does not include a logical block used by the file system, then that stripe is determined as being not used by the file system 11. A flag indicating the "not being used" state is set in the corresponding entry. After preparing the disk resource management table 120, the disk array controller 22 overwrites the table existing in the disk resource management table area 222b of the memory 222 (Step S5).

Where the disk array system 20 correlates the logical block numbers and the stripe numbers, as in the above, the host computer 10 does not have to consider the stripe size unique to the disk array system 20. In this case, however, the disk array system 20 has to consider the logical block size unique to the host computer 10.

If the disk resource management information list 90 shown in FIG. 9 is reassigned with a disk resource management information list 100 having the data structure shown in FIG. 10, then the disk array system 20 need not consider the logical block size unique to the host computer 10. The disk resource management information list 100 of FIG. 10 contains a group of stripe numbers 101 indicating stripes that include logical blocks 24 used by the file system 11. To enable the host computer 10 to prepare the list 100, the host computer 10 has to acquire data on the stripe size from the disk array controller 22 of the disk array system 20 beforehand. Then, the correlation between the logical block numbers and the stripe numbers must be executed in accordance with the dedicated software 13 installed in the host computer 10.

Figure 5:
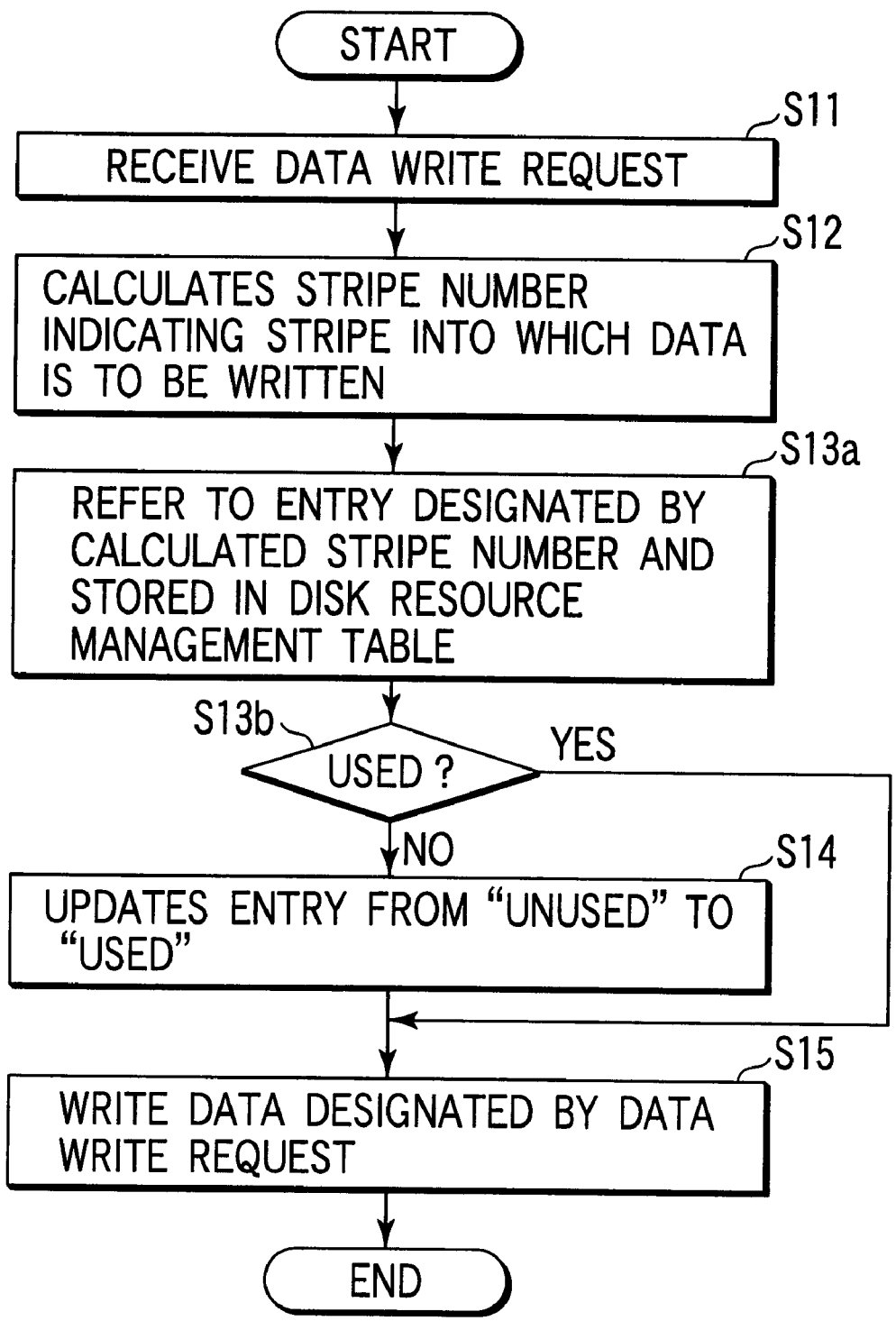
FIG. 5 is a flowchart showing the processing procedures that are followed when the host computer 10 transmits a data write request to the disk array system 20.

(2) Next, a description will be given with reference to FIG. 5 of the processing performed when the host computer 10 transmits a data write request to the disk array system 20. In connection with the description below, let us assume that the disk resource management table 120 shown in FIG. 3B is stored in the disk resource management table area 222b of the memory 222.

First of all, let us assume that a data write request is transmitted from the file system 11 of the host computer 10 to the disk array system 20. In this case, the disk array controller 22 of the disk array system 20 receives the data write request transmitted from the file system 11 of the host computer 10 (Step S11). This request includes information on the start address and size of an area into which data is to be written. The disk array controller 22 examines the start address and size of the received data write request and calculates a stripe number that indicates a stripe into which the data is to be written (Step S12).

Next, the disk array controller 22 refers to the entry designated by the stripe number calculated in Step S12 (Step S13a). This entry is included among the entries of the disk resource management table 120 stored in the disk resource management table area 222b. The disk array controller 22 examines the state of the flag set in the entry it referred to, and determines whether the stripe into which data is to be written (i.e., the stripe designated by a stripe number) is used by the file system 11 (stripe S13b). If the stripe into which data is to be written is an unused one, the disk array controller 22 determines that the write operation designated by the data write request from the host computer 10 will change the state of the stripe including the logical block designated by that request from an unused state to a used state. Therefore, the disk array controller 22 updates the content of the entry of the disk resource management table 120 referred to in Step S13a from the unused state to the used state (Step S14). After executing Step S14, the disk array controller 22 writes the data designated by the data write request issued from the host computer 10 in the disk array 21 (Step S15).

On the other hand, if the stripe into which data is to be written, i.e., the stripe designated by the stripe number calculated in Step S12, is already used by the file system 11 (Step S13b), then the disk array controller 22 skips Step S14 and advances to Step S15. In this Step S15, the disk array controller 22 executes the data write operation designated by the data write request issued from the host computer 10.

According to the present embodiment, when the data write request from the host computer 10 is received by the disk array controller 22 (i.e., when a file is to be updated in the disk array system 20), the disk array controller 22 automatically updates the disk resource management table 120 of the memory 222 on the basis of the data write request. By this automatic updating, the used state of the stripes is kept new at all times. Since the automatic updating is executed whenever a data write request is made, the performance does not lower. This is advantageous in comparison with the case where the disk resource management table 12 in the newest state is acquired from the host computer 10 for updating, each time a file is updated in response to a request from the host computer 10.

Figure 6:
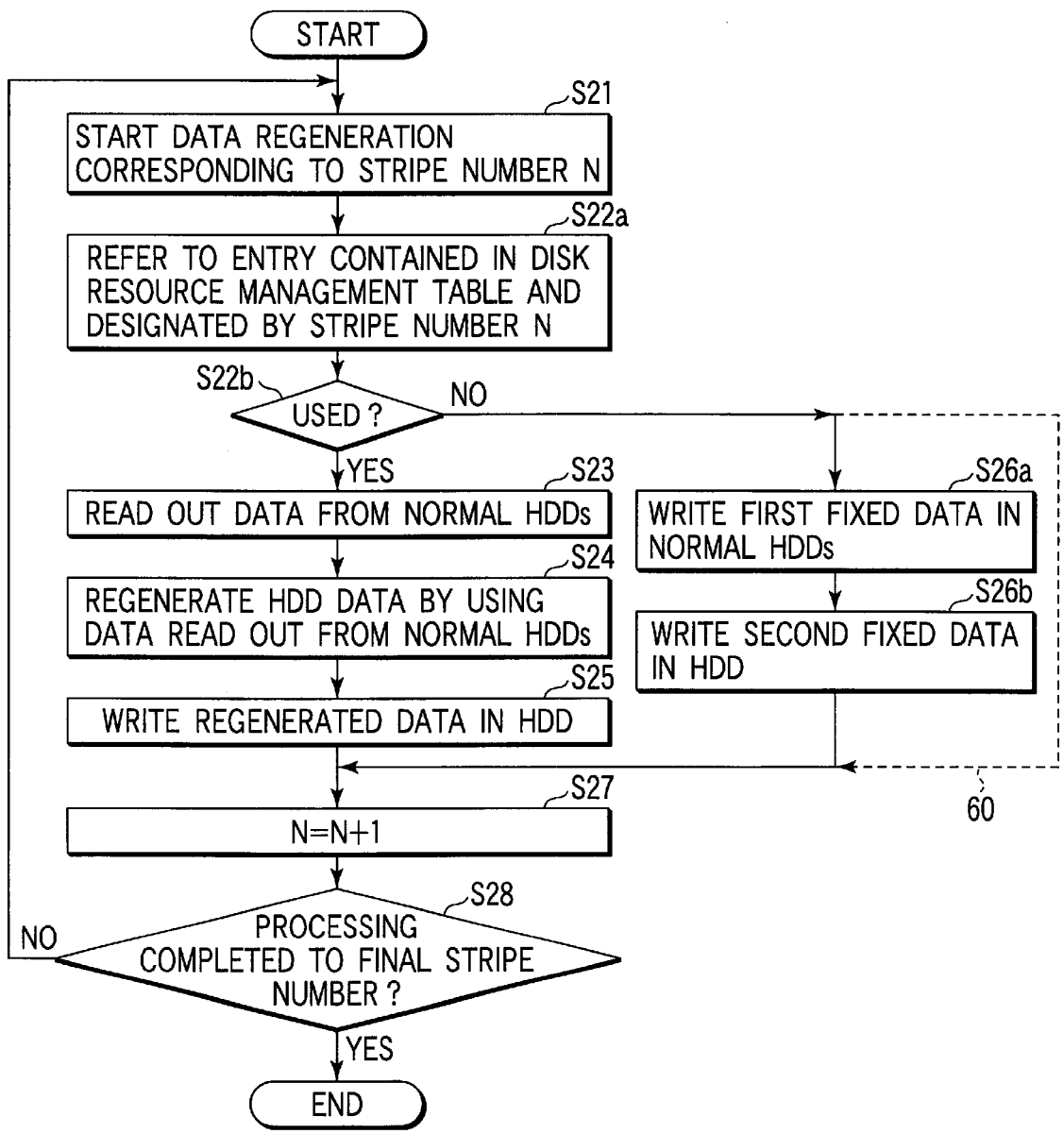
FIG. 6 is a flowchart illustrating the data regeneration processing procedures followed by the disk array system 20.

(3) A description will be given of the data regeneration processing of the disk array system 20 with reference to the flowchart shown in FIG. 6.

Let us assume that one of the HDDs 210-0 to 210-3 fails (for example, HDD 210-3 fails), and that the failed HDD 210-3 is reassigned with new HDD 210-3, with the data in old HDD 210-3 being regenerated in new HDD 210-3. For the sake of simplicity, both new and old HDDs, i.e., the HDD for replacing and the HDD to be reassigned, are denoted by the same reference numeral 210-3 herein. The new HDD 210-3 may be a spare HDD connected to the disk array controller 22 beforehand.

If the HDD 210-3 fails, the disk array controller 22 regenerates the data stored in the failed (old) HDD 210-3 and stores the regenerated data in the new HDD 210-3. This regeneration processing is executed in order from the first stripe, i.e., from the stripe whose stripe number is 0 (Step S21).

To regenerate the data that is stored in the stripe 23 whose stripe number is N (the initial value of which is "0"), the disk array controller 22 refers to the entry which is included in the disk resource management table 120 and which is designated by stripe number N (Step S22a). On the basis of the state of the flag set in that entry, the disk array controller 22 determines whether or not the file system 11 uses the stripe 23 whose stripe number is N (Step S22b).

Figure 11:
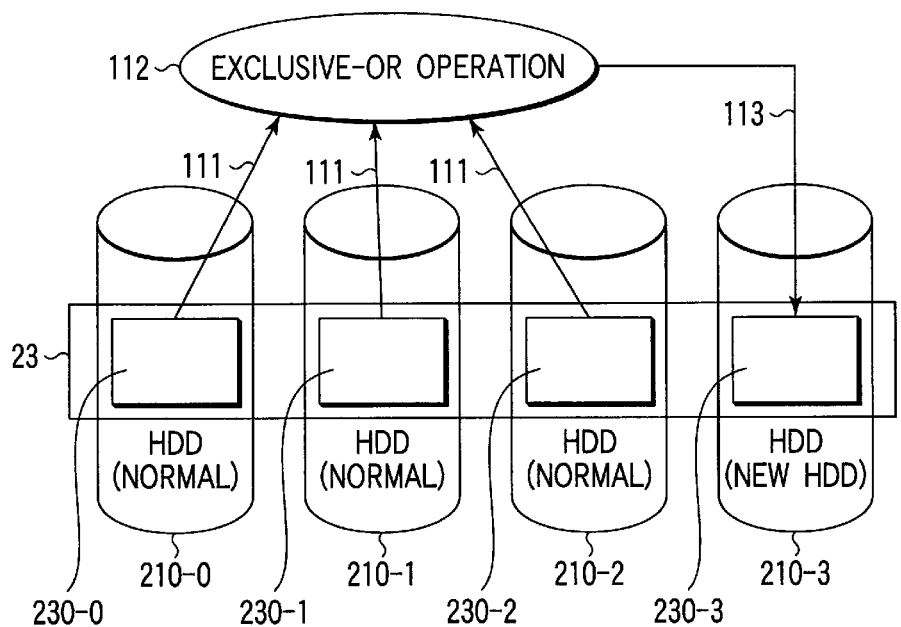
FIG. 11 illustrates ordinary data regeneration processing according to RAID level 5.

If the stripe 23 of stripe number N is used then, the disk array controller 22 uses the conventionally known RAID technology and executes ordinary data regeneration processing in the manner shown in FIG. 11. First, the disk array controller 22 reads data from the areas 230-0 to 230-2 which are included in the stripe 23 to be regenerated and which are parts of HDD 210-0 to 210-2 (Step S23). Then, the disk array controller 22 acquires the regenerated data, using the data obtained by data reading 111 (Step S24). The regenerated data is acquired, using the RAID technology. To be more specific, the disk array controller 22 executes an exclusive-OR operation with respect to the data read out from the areas 230-0 to 230-2 of the normally-operating HDDs 210-0 to 210-2. The results of this operation are acquired as regenerated data. Subsequently, the disk array controller 22 writes the acquired data in area 230-3 (Step S25), which is included in the stripe 23 and which is part of new HDD 210-3. (The data writing operation is indicated by "113" in FIG. 11.) In this manner, the data stored in the old HDD 210-3 is regenerated in new HDD 210-3.

Figure 12:
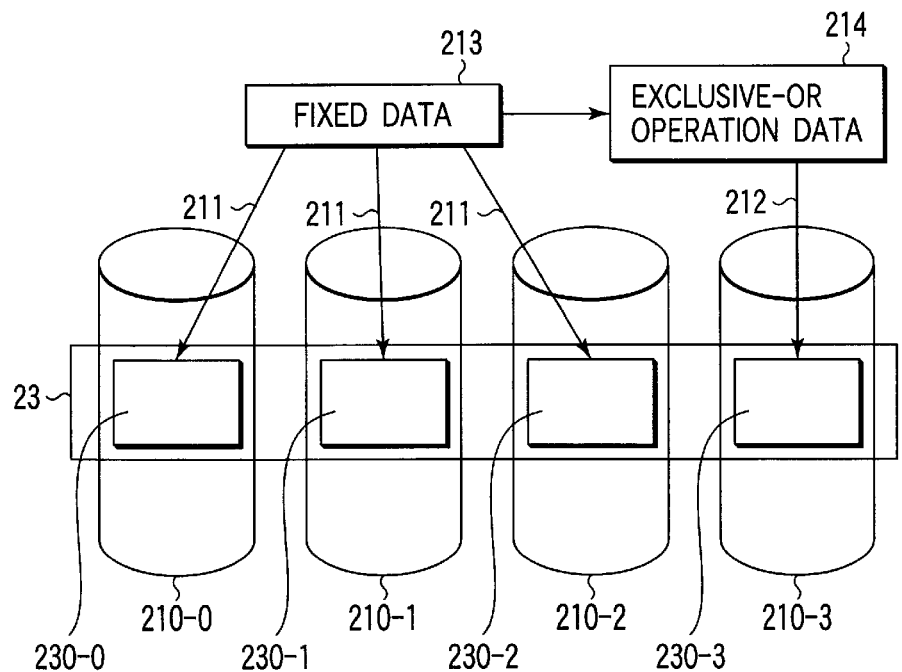
FIG. 12 illustrates how fixed data is written in a stripe that is not used by a file system 11.

If the stripe 23 of stripe number N is not used, the disk array controller 22 determines that no effective data which should be regenerated is not stored in the stripe 23. In this case, the disk array controller 22 operates in the manner shown in FIG. 12. As shown, the disk array controller 22 writes predetermined first fixed data 213 in the areas 230-0 to 230-2 which are included in the stripe 23 and which are parts of the normally-operating HDD 210-0 to 210-2 (Step S26a). (This writing operation is indicated by "211" in FIG. 12.) Subsequently, the disk array controller 22 writes data 214 in area 230-3 (Step S26b), which is included in the stripe 23 and which is part of the new HDD 210-3. Data 214 is data obtained by executing an exclusive-OR operation between the first fixed data 213 written in the areas 230-0 to 230-2 of the HDDs 210-0 to 210-2. It should be noted that the exclusive-OR data 214 to be written in area 230-3 has a fixed value. This means that the exclusive-OR data 214 written in the area 230-0 to 230-2 may be either one of the following two: the data obtained by actually executing an exclusive-OR operation with respect to the first fixed data 213 written in areas 230-0 to 230-2; and second fixed data which is equal to the result of the exclusive-OR operation of the first fixed data. By performing Steps S26a and S26b, the fixed data is written in the stripe 23 which is not used by the file system 11. Since Steps S26a and S26b do not read data from the normally-operating HDD 210-0 to 210-2, they can be executed in a short time, compared with the case where data stored in the stripe 23 used by the file system 11 is regenerated (Steps S23 to S25). Since no data is read from the HDD 210-0 to 210-2, the risk of multi-failure of the HDDS significantly lowers.

As described, according to the present embodiment, the processing is limited only to the stripe the file system actually uses, and the data stored in the failed HDD 210-3 is regenerated based on the RAID technology. Hence, the processing time required for the data regeneration can be shortened. In addition, since the processing time required for the data regeneration can be short, the probability of multi-failure of the HDDs is reduced, and the risk of a fatal phenomenon, such as the complete failure of the disk array, can be reduced.

According to the present embodiment, fixed data is written in a stripe not used by the file system. By so doing, data regeneration based on RAID technology does not have to be carried out, and yet the matching between the data and the redundancy data is attained in the RAID technology. In addition, the file not used by the file system does not store effective data that must be regenerated. This being so, the fixed data can be written in the stripe without any problems. Unlike the data regeneration based on the RAID technology, the writing of fixed data does not necessitate an operation of reading data from the normally-operating HDDs, and the processing time can be shortened, accordingly. Data is not read out from the normally-operating HDDs, and this leads to a remarkable decrease in the probability of multi-failure of the HDDs. The reasons for this are as follows:

In order to regenerate the data stored in a failed HDD according to RAID level 5, as above, data must be read out from the other normally-operating HDDs, an exclusive-OR operation has to be executed with respect to the readout data, and the results of this operation have to be written in the HDD that is used in place of the failed HDD. If a media trouble occurs when data is being read from the normally-operating HDDs, the data regeneration cannot be continued. As a result, the disk array may fail completely. According to the present embodiment, when the stripe to be processed is not used by the file system, the data regeneration does not necessitate an operation of reading out data from the normally-operating HDDs. The probability of the multi-failure of the HDDs is remarkably reduced, and the reliability of the disk array system 20 is increased further.

At the end of Step S25 or Step S26b, the disk array controller 22 increments the stripe number N by 1 (Step S27). The disk array controller 22 repeats Steps S21-S27 until the incremented stripe number N exceeds the final stripe number (Step S28).

In the data regeneration processing described above, fixed data is written in the stripe not used by the file system (Steps S26a and S26b). However, the stripe not used by the file system 11 does not store effective data to be regenerated. It follows from this that Steps S26a and S26b (i.e., the stripe regenerating operation using fixed data) can be skipped, as indicated by the broken line 60 in the flowchart shown in FIG. 6. In comparison with the case where the regeneration is based on the writing of fixed data, the processing time can be shortened further. As a result, the risk of the multi-failure of the HDD further lowers, and the host computer 10 can access the disk array system 20 with a minimum deterioration in efficiency.

Figure 7:
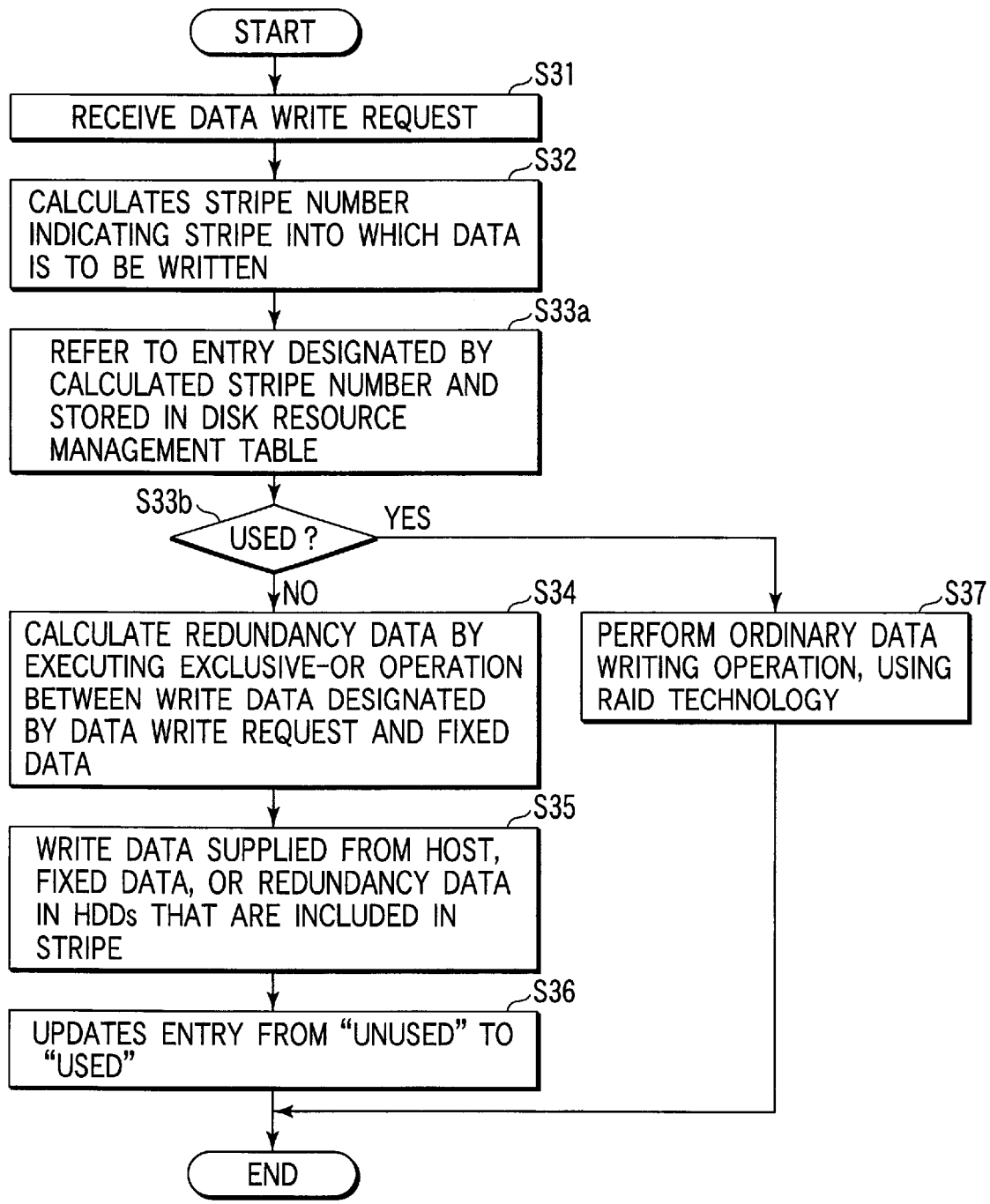
FIG. 7 is a flowchart showing a modification of the processing procedures that are followed when the host computer 10 transmits a data write request to the disk array system 20.
Figure 13:
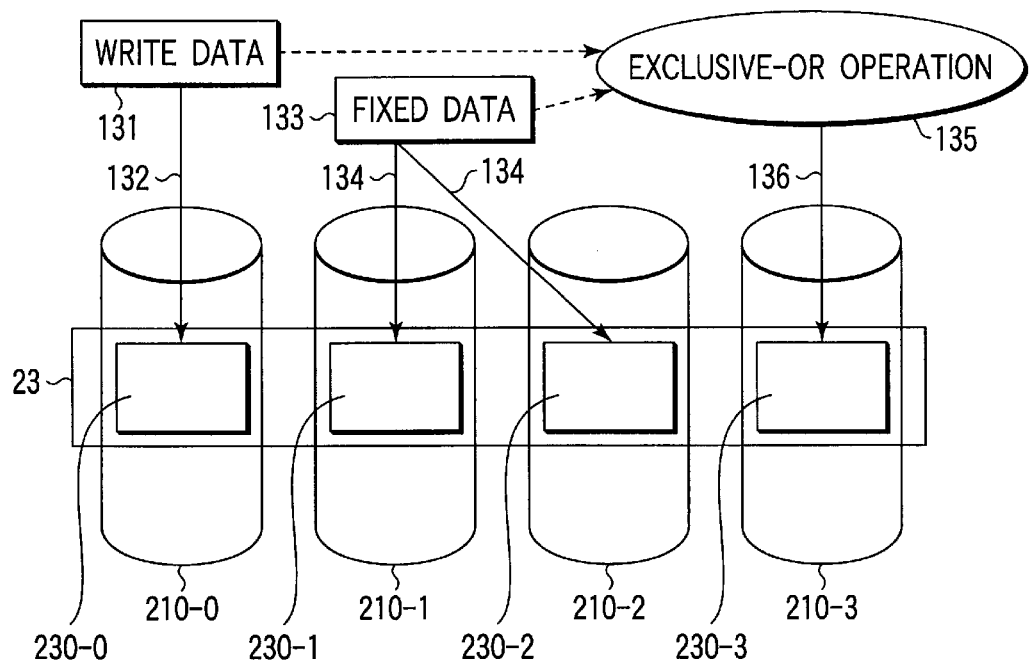
FIG. 13 illustrates how new data is written in a stripe that is not used by the file system 11.

The omission of Steps S26a and S26b has problems in that matching between the data and the redundancy data is not attained on RAID level 5 with respect to the stripe not used by the file system 11. In short, correct parity data may not be generated for data. To solve this problem, if Steps 26a and 26b are omitted, a data write request from the host computer 10 is desirably processed in the manner shown in FIG. 13 by executing the procedures shown in FIG. 7.

Let us assume that a data write request is transmitted from the file system 11 of the host computer 10 to the disk array system 20. In this case, the disk array controller 22 of the disk array system 20 receives the data write request transmitted from the file system 11 of the host computer 10 (Step S31). The disk array controller 22 calculates a stripe number that indicates a stripe 23 into which the data is to be written (Step S32). Next, the disk array controller 22 refers to the entry designated by the stripe number calculated in Step S32. This entry is included among the entries of the disk resource management table 120 stored in the disk resource management table area 222b (Step S33a). The disk array controller 22 examines the state of the flag set in the entry it referred to, and determines whether the stripe into which data is to be written (i.e., the stripe designated by a stripe number) is used by the file system 11 (stripe S33b). Up to this point, the operations are similar to those of Steps S11 to S13b of the flowchart shown in FIG. 5.

If the stripe 23 into which data is to be written is not used by the file system 11, the disk array controller 22 determines that matching based on the parity data of RAID level 5 is not attained in connection with the stripe 23. In this case, the disk array controller 22 executes an exclusive-OR operation between the following two: the write data 131 designated by the data write request made by the host computer 10 (i.e., the data to be newly written); and predetermined fixed data 133 for HDDS, the number of which is equal to the number obtained by subtracting "2" from the total number of HDDs included in the disk array 21. The results of this operation are acquired as correct parity data (redundancy data) (Step S34). Given that the fixed data 133 is data whose bits are all "0", the parity data (redundancy data), which is the result of the exclusive-OR operation 135, is the same as the write data 131. In this case, the write data 131 can be used as the results (redundancy data) of the exclusive-OR operation 135, the exclusive-OR operation 135 need not be executed.

Then, the disk array controller 22 writes data in the areas 230-0 to 230-2 of the HDDs 210-0 to 210-3 included in the stripe 23 in which data is to be written (Step S35). The data written in the HDDs is specifically the write data 131, fixed data 133, or the result (redundancy data) of the exclusive-OR operation 135. The HDD which the data write request from the host computer 10 designates as a data write destination is assumed to be HDD 210-0, and the HDD included in the stripe 23 and storing redundancy data is HDD 210-3. In this case, the operation 132 for writing the write data 131 in HDD 210-0, the operations 134 for writing the fixed data 133 in HDDs 210-1 and 210-2, and the operation 136 for writing the results (redundancy data) of the exclusive-OR operation 135 in HDD 210-3 are executed. By these writing operations, data redundancy can be guaranteed even for the stripe for which data regeneration is omitted at the time of the failure of an HDD.

At the end of Step S35, the disk array controller 22 updates the content of the entry referred to in Step S33a and include among the entries of the disk resource management table 120 (Step S36). The entry indicates whether or not the stripe 23 into which data is to be written is used, and the disk array controller 22 changes the state of this entry from "not being used" to "being used."

If the stripe 23 into which data is to be written is used by the file system 11, the disk array controller 22 uses the RAID technology and executes an ordinary data write operation (Step S37). First, the disk array controller 22 executes an exclusive-OR operation between the following: write data (new data) 131 designated by the data write request; data (old data) stored in the HDD area into which the new data 131 is to be stored; and parity data (old parity data) which is included in the same stripe 23 but stored in another HDD area. Based on this exclusive-OR operation, new parity data (new redundancy data) is generated. Using this new parity data, the disk array controller 22 updates the old parity data.

Figure 8:
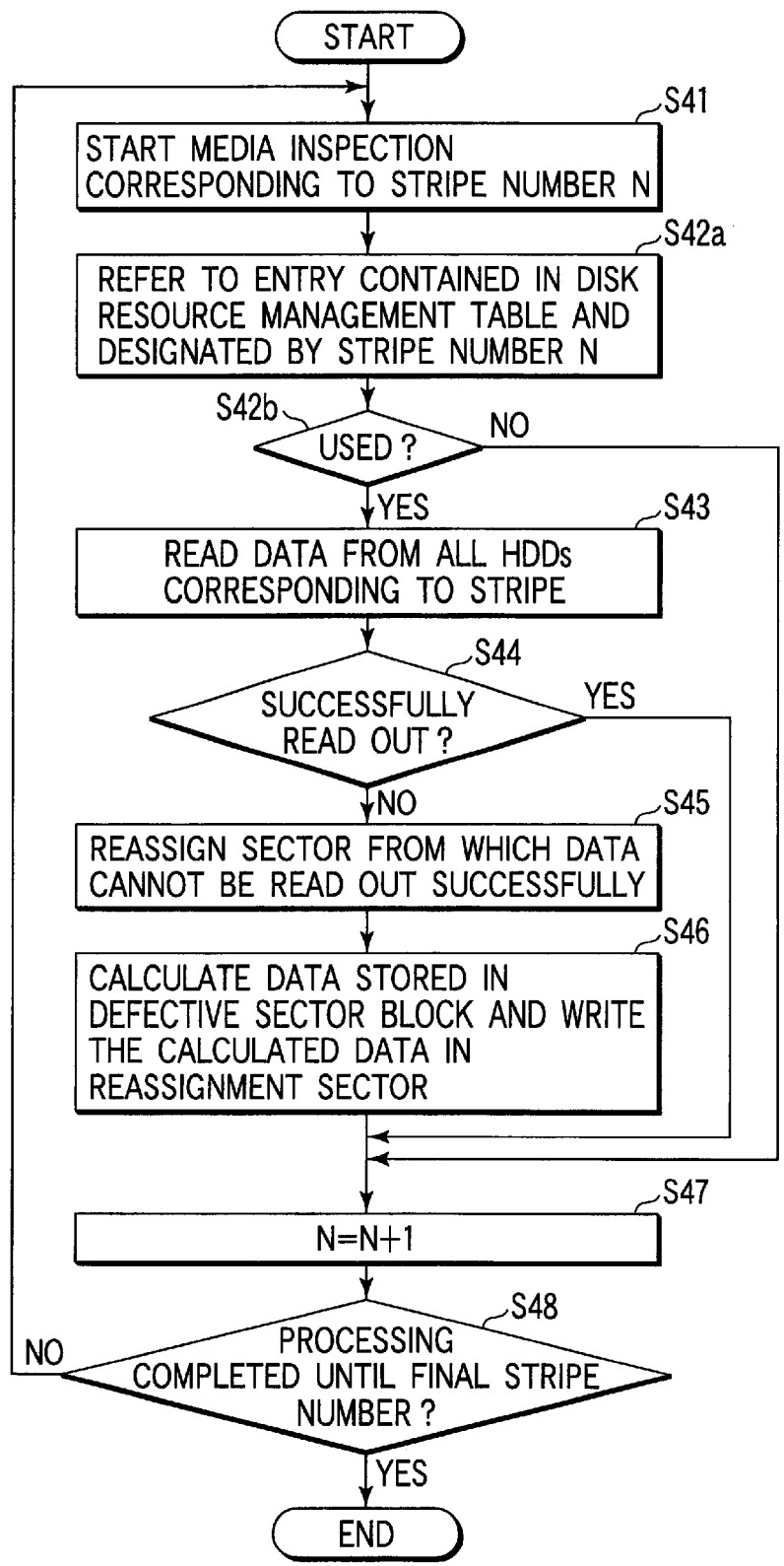
FIG. 8 is a flowchart illustrating the processing procedures the disk array system 20 follows for media inspection.

(4) A description will now be given with reference to the flowchart shown in FIG. 8 as to how the disk array system 20 executes media inspection processing.

The disk array controller 22 periodically executes media inspection for the disk array 21 by using the patrol function of the controller 22. In the present embodiment, the disk array controller 22 executes the media inspection in such a manner that the stripes are inspected in order, beginning with the stripe whose stripe number N is "0" (Step S41).

For the media inspection of the stripe 23 whose stripe number is N (the initial value of which is "0"), the disk array controller 22 refers to the entry designated by the stripe number N and included in the disk resource management table 120 (Step S42a). In accordance with the state of the flag set in that entry, the disk array controller 22 determines whether or not the stripe 23 designated by the stripe number N is used by the file system 11 (Step S42b).

If the stripe 23 designated by the stripe number N is used then, the disk array controller 22 reads data from all HDDs 210-0 to 210-3 (Step S43). Then, the disk array controller 22 checks the data read out from the HDDs 210-0 to 210-3 and determines whether or not the readout operations have been successful (Step S44).

Figure 14:
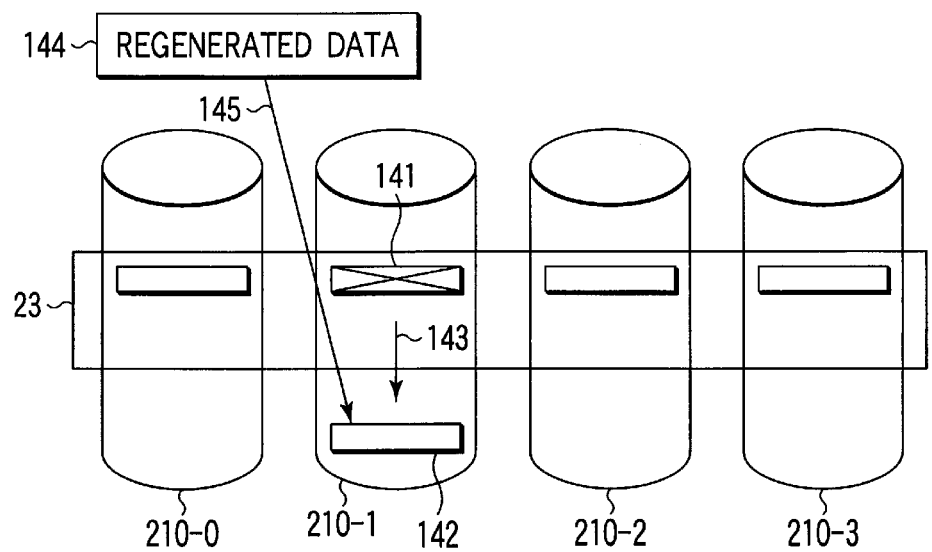
FIG. 14 illustrates a data regeneration operation performed when a defective sector block is detected in media inspection.

If the data readout operation from any one of the HDDS 210-0 to 210-3 ends in failure, the disk array controller 22 executes reassignment processing (Step S45). By this processing, a sector block from which data has not been read successfully (i.e., a defective sector block where a media trouble occurs) is reassigned with another sector (a reassignment sector). For example, if sector block 141 of HDD 210-1 is detected as a defective one, as shown in FIG. 14, reassignment processing 143 is executed to reassign that sector block 141 with an arbitrary reassignment sector 142 of the same HDD 210-1. Then, the disk array controller 22 uses the RAID technology and calculates the regenerated data 144 corresponding to the defective sector block 141. Then, the operation 145 for writing the data 144 in the reassignment sector 142 is performed (Step S46). Thereafter, the disk array controller 22 advances to Step S47.

If the operations from reading out data from the HDDs 210-0 to 210-3 are successfully completed with respect to the stripe 23 indicated by the stripe number N, then the disk array controller 22 skips Steps S45 and S46 and advances to Step S47.

If the stripe 23 designated by the stripe number N is not used by the file system 11, the disk array controller 22 does not inspect the stripe 23. In this case, the disk array controller 22 skips S43 to S46 and advances to Step S47.

In Step S47, the disk array controller 22 increments the stripe number N by "1." The disk array controller 22 repeats the operation starting from Step S41, until the incremented stripe number N exceeds the final stripe number (Step S48).

As described above, only the stripe used by the file system 11 is extracted for the media inspection. Thanks to this feature, the processing time required for the inspection is shortened. Since the processing time is short, a media trouble can be detected in an early stage, thus improving the reliability of the HDDs. The reliability of the disk array system 20 is also enhanced.

Figure 15:
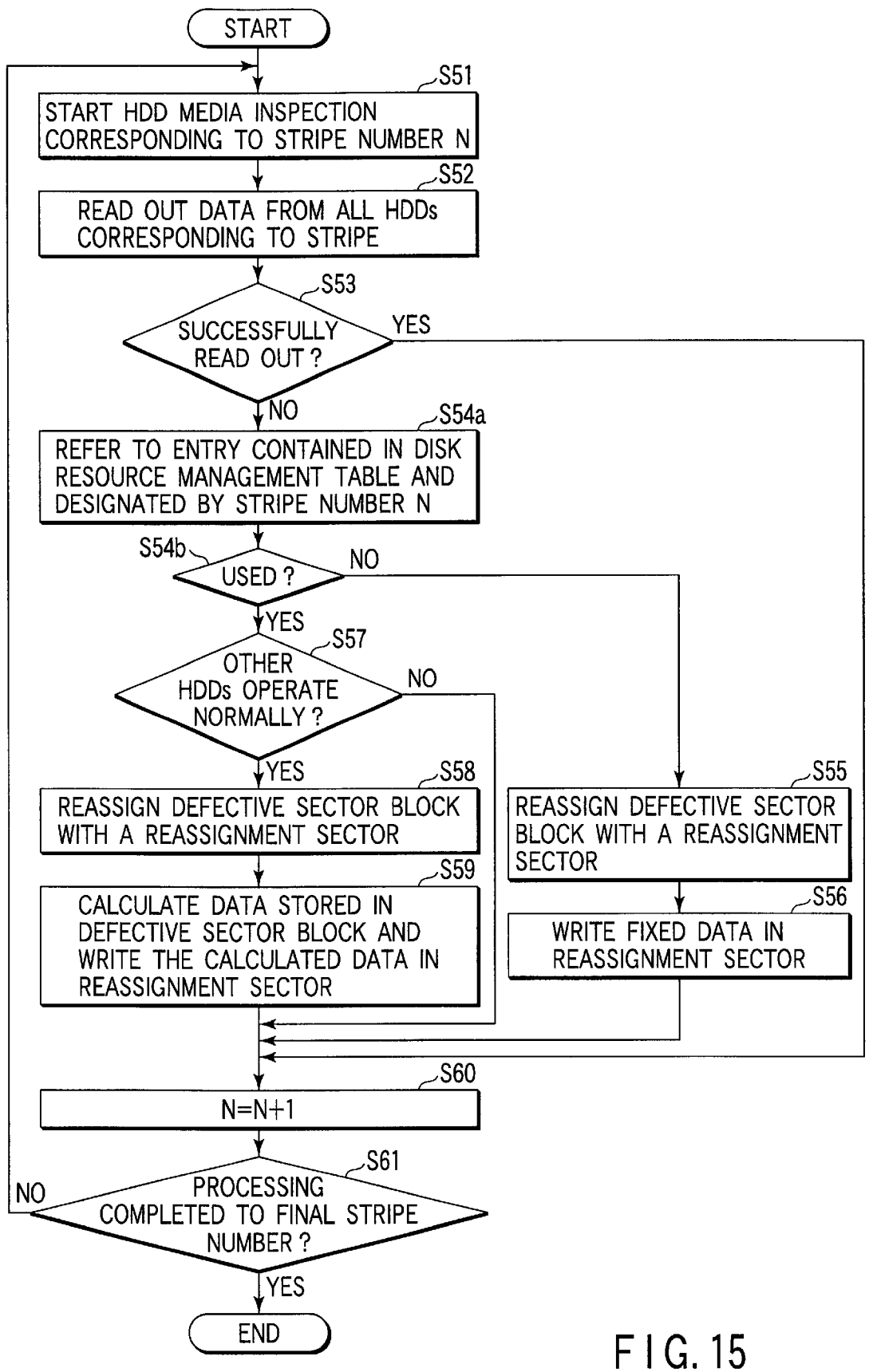
FIG. 15 is a flowchart illustrating a modification of the processing procedures for media processing shown in FIG. 8.

A modification of the media inspection processing will be described with reference to the flowchart shown in FIG. 15. According to this modification, the stripes of the disk areas of the disk array system 20 are subjected to media inspection (Steps S51 to S53) by reading out data from the HDDs, and this media inspection of the stripes is executed without reference to the states of the stripes i.e. whether or not the stripes are used by the file system. In this point, the modification differs from the above-mentioned media inspection processing shown by the flowchart in FIG. 8.

If the inspection based on the operation of reading out data detects a sector block (a defective sector block) that has caused a media trouble, then the disk array controller 22 refers to the disk resource management table 120 and checks whether or not the stripe containing the sector block is used by the file system 11 (Steps S54a and 54b).

If the stripe containing the defective sector is not used by the file system, the data in that stripe need not be retained. Thus, the disk array controller 22 executes reassignment processing 163 (Step S55) without reference to the presence or absence of the redundancy of the RAID. In this reassignment processing 163, the defective sector block 161 is reassigned with another sector (a reassignment sector) 162 of the same HDD. Then, the disk array controller 22 performs the operation 165 for writing predetermined fixed data 164 (not regenerated data) in the reassignment sector 162 (Step S56). As a result, the data in the defective sector block 161 is regenerated in the reassignment sector 162. The fixed data 164 corresponds to the second fixed data regenerated in Step S26b and written in the HDD. In Step S56, fixed data corresponding to fixed data 164 is written in a normally-operating HDD sector corresponding to the reassignment sector 162. The fixed data corresponds to the first fixed data written in each normally-operating HDD in Step S26a described above.

If the stripe mentioned above is used by the file system 11, a check is made to see whether there is a failure in other HDDs (Step S57). If there is not such a failure, it is determined that the data redundancy is assured. Thus, the disk array controller 22 executes the processing similar to that of Steps S45 and S46 shown in FIG. 8, as follows. First, the disk array controller 22 reassigns the defective sector block with a reassignment sector (Step S58). Then, the disk array controller 22 regenerates data stored in the defective sector block on the basis of the RAID technology and writes the regenerated data in the reassignment sector (Step S59).

If the data redundancy is not attained due to the failure of another HDD (Step S57), the data stored in the defective sector block cannot be regenerated by use of the RAID technology. In this case, therefore, the disk array controller 22 skips S58 and S59 and leave the defective sector block as it is.

If the stripe containing an area where media inspection detects a trouble is used by the file system 11, the modification checks whether the HDDs other than the HDD containing that trouble are operating normally only when the other HDDS are operating normally, does the modification regenerate the data stored in the area. If the stripe containing the trouble-detected area is not used by the file system 11, the data in that stripe need not be retained. In this case, therefore, the data stored in the trouble-detected area is regenerated by use of fixed data without reference to the states of the HDDs other than the trouble-detected HDD, i.e., without reference to the assurance of the data redundancy based on the RAID technology. Thanks to this feature, the probability of the media trouble being restored can be remarkably increases, improving the reliability of the HDDs and disk array system 20.

In the above embodiment, the disk array system 20 was described as being used on RAID5 level. It should be noted, however, that the present invention is applicable to the disk array system used on another RAID level, such as RAID3 level, even though the data regeneration method differs between different RAID levels.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for regenerating data stored in a disk array system comprising a RAID (Redundant Array of Inexpensive Disks) structure disk array comprising a plurality of disk drives having disk areas managed in units of one stripe, said disk array system being used by a host computer having a file system that manages the disk areas of the disk array in units of one logical block, said method comprising:

acquiring a disk resource management information list from the host computer, the disk resource management information list indicating one of: (i) all logical blocks used by the file system; and (ii) all stripes including the logical blocks;

generating a disk resource management table from the disk resource management information list, the disk resource management table representing, for each of the stripes of the disk areas of the disk array, whether each stripe includes a logical block that is used by the file system;

specifying a stripe to which a data write destination belongs, when a data write request designating the data write destination is received from the host computer;

determining whether the specified stripe is a first stripe or a second stripe, based on the disk resource management table, the first stripe being a stripe that includes a logical block used by the file system, and the second stripe being a stripe that does not include a logical block used by the file system;

updating the disk resource management table if the specified stripe is the second stripe, in such a manner that the updated disk resource management table shows that the specified stripe is the first stripe;

determining whether each of the stripes included in the disk areas of the disk array is the first stripe or the second stripe in response to a failure of one of the disk drives, based on the disk resource management table; and regenerating data by use of the RAID structure disk array with respect only to a stripe that has been determined as being the first stripe.

2. A method for regenerating data stored in a disk array system comprising a RAID (Redundant Array of Inexpensive Disks) structure disk array comprising a plurality of disk drives having disk areas managed in units of one stripe, said disk array system being used by a host computer having a file system that manages the disk areas of the disk array in units of one logical block, said method comprising:

acquiring a first disk resource management information from the host computer, the first disk resource management information indicating one of a logical block used by the file system and a stripe including the logical block;

generating a second disk resource management information from the first disk resource management information, the second disk resource management information being prepared for each of the stripes of the disk areas of the disk array and representing whether each stripe includes a logical block that is used by the file system, determining whether each of stripes included in the disk areas of the disk array is a first stripe or a second stripe in response to a failure of one of the disk drives, based on the second disk resource management information, said first stripe being a stripe that includes a logical block used by the file system, and the second stripe being a stripe that does not include a logical block used by the file system;

regenerating data by use of RAID structure disk array with respect only to a stripe that has been determined as being the first stripe;

specifying a stripe to which a data write destination belongs, when a data write request designating the data write destination is received from the host computer;

determining whether the specified stripe is the first stripe or the second stripe, based on the second disk resource management information;

generating redundancy data in response to the specified stripe being determined as the second stripe, said redundancy data being generated based on a write data designated by the data write request and predetermined fixed data;

writing the write data, the fixed data and the generated redundancy data in corresponding areas of the specified stripe; and updating the second disk resource management information in such a manner that the updated second disk resource management information shows that the specified stripe, to which the writing is executed, is the first stripe.

3. A method for regenerating data stored in a disk array system comprising a RAID (Redundant Array of Inexpensive Disks) structure disk array comprising a plurality of disk drives having disk areas managed in units of one stripe, said disk array system being used by a host computer having a file system that manages the disk areas of the disk array in units of one logical block, said method comprising:

acquiring a disk resource management information list from the host computer, the disk resource management information list indicating one of: (i) all logical blocks used by the file system; and (ii) all stripes including the logical blocks;

generating a disk resource management table from the disk resource management information list, the disk resource management table representing, for each of the stripes of the disk areas of the disk arrays, whether each stripe includes a logical block that is used by the file system;

storing the disk resource management table in said disk array system;

specifying a stripe to which a data write destination belongs, when a data write request designating the data write destination is received from the host computer;

determining whether the specified stripe is a first stripe or a second stripe, based on the disk resource management table, the first stripe being a stripe that includes a logical block used by the file system, and the second stripe being a stripe that does not include a logical block used by the file system;

updating the disk resource management table if the specified stripe is the second stripe, in such a manner that the updated disk resource management table shows that the specified stripe is the first stripe;

determining whether each of the stripes included in the disk areas of the disk array is the first stripe or the second stripe in response to an execution of a media inspection, based on the disk resource management table, wherein a storage contents of each of the disk drives of the disk array are read out to detect a local trouble of the disk drives;

executing the media inspection, which includes reading out data from the disk drives, only for a stripe that has been determined as being the first stripe; and regenerating data stored in an area where the media inspection detects the trouble, by use of the RAID structure disk array.

4. A method for regenerating data stored in a disk array system comprising a RAID (Redundant Array of Inexpensive Disks) structure disk array comprising a plurality of disk drives having disk areas managed in units of one stripe, said disk array system being used by a host computer having a file system that manages the disk areas of the disk array in units of one logical block, said method comprising:

acquiring a disk resource management information list from the host computer, the disk resource management information list indicating one of: (i) all logical blocks used by the file system; and (ii) all stripes including the logical blocks;

generating a disk resource management table from the disk resource management information list, the disk resource management table representing, for each of the stripes of the disk areas of the disk arrays, whether each stripe includes a logical block that is used by the file system;

storing the disk resource management table in said disk array system;

executing a media inspection wherein a storage contents of each of the disk drives of the disk array are read out to detect a local trouble of any of the disk drives, said media inspection being sequentially executed for all stripes included in the disk areas of the disk array;

determining whether a stripe including an area where a local trouble is detected is a first stripe or a second stripe in response to the local trouble being detected in the disk drives by the media inspection, based on the disk resource management table;

regenerating data stored in the area where the trouble is detected, by use of the RAID, in a case where the stripe including the area where the local trouble is detected is determined as the first stripe and where the disk drives of the disk array, which are other than the disk drive where the trouble is detected, are operating normally; and regenerating data stored in the area where the trouble is detected, by use of a fixed data, in a case where the stripe including the area where the local trouble is detected is determined as being the second stripe.

5. A disk array controller for controlling a RAID (Redundant Array of Inexpensive Disks) structure disk array comprising a plurality of disk drives having disk areas managed in units of one stripe, said disk array controller being connected to a host computer having a file system that manages the disk areas of the disk array in units of one logical block, said disk array controller comprising:

means for generating a disk resource management table from a disk resource management information list, the disk resource management information list being transmitted from the host computer and representing one of: (i) all logical blocks used by the file system; and (ii) all stripes including the logical blocks, the disk resource management table representing, for each of the stripes of the disk areas of the disk array, whether each stripe includes a logical block that is used by the file system;

a memory which stores the disk resource management table;

means for specifying a stripe to which a data write destination belongs, when a data write request designating the data write destination is received from the host computer;

first determining means for determining whether the specified stripe is a first stripe or a second stripe, based on the disk resource management table, the first stripe being a stripe that includes a logical block used by the file system, and the second stripe being a stripe that does not include a logical block used by the file system;

means for updating the disk resource management table if the specified stripe is the second stripe, in such a manner that the updated disk resource management table shows that the specified stripe is the first stripe;

second determining means for determining whether each of stripes included in the disk areas of the disk array is the first stripe or the second stripe; and means for regenerating a data stored in a given one of the disk drives when said given one is detected as failing, and storing the regenerated data in another disk drive that is used in place of said given one, said regenerating means regenerating data by use of the RAID with respect to a stripe that is among the stripes included in the disk areas of the disk array and that is determined as being the first stripe by the second determining means.

6. A disk array controller for controlling a RAID (Redundant Array of Inexpensive Disks) structure disk array comprising a plurality of disk drives having disk areas managed in units of one stripe, said disk array controller being connected to a host computer having a file system that manages the disk areas of the disk array in units of one logical block, said disk array controller comprising:

means for generating a disk resource management table from a disk resource management information list, said disk resource management information list being transmitted from the host computer and representing one of: (i) all logical blocks used by the file system; and (ii) all stripes including the logical blocks, and said disk resource management table representing, for each of the stripes of the disk areas of the disk array, whether each stripe includes a logical block that is used by the file system;

a memory which stores the disk resource management table;

means for specifying a stripe to which a data write destination belongs, when a data write request designating the data write destination is received from the host computer;

first determining means for determining whether the specified stripe is a first stripe or a second stripe, based on the disk resource management table, the first stripe being a stripe that includes a logical block used by the file system, and the second stripe being a stripe that does not include a logical block used by the file system;

means for updating the disk resource management table if the specified stripe is the second stripe, in such a manner that the updated disk resource management table shows that the specified stripe is the first stripe;

second determining means for determining whether each of stripes included in the disk areas of the disk array is the first stripe or the second stripe;

media inspection means for detecting a local trouble in any of the disk drives by reading a storage contents from each of the disk drives, said media inspection means reading data from the disk drives with respect to a stripe that has been determined as being the first stripe by the second determining means; and means for regenerating data stored in an area where the trouble is detected by the media inspection means, by use of the RAID.

7. A disk array controller for controlling a RAID (Redundant Array of Inexpensive Disks) structure disk array comprising a plurality of disk drives having disk areas managed in units of one stripe, said disk array controller being connected to a host computer having a file system that manages the disk areas of the disk array in units of one logical block, said disk array controller comprising:

means for generating a disk resource management table from a disk resource management information list, said disk resource management information list being transmitted from the host computer and representing one of: (i) all logical blocks used by the file system; and (ii) all stripes including the logical blocks, and said disk resource management table representing, for each of the stripes of the disk areas of the disk array, whether each stripe includes a logical block that is used by the file system;

a memory which stores the disk resource management table;

media inspection means for executing a media inspection, which detects a local trouble in any of the disk drives by reading storage contents from each of the disk drives, said media inspection being executed in units of one stripe for all stripes included in the disk areas of the disk array;

means for determining, based on the disk resource management table, whether a stripe including an area where a local trouble is detected is a first stripe or a second stripe in response to the local trouble being detected in the disk drives by the media inspection means, the first stripe being a stripe that includes a logical block used by the file system, and the second stripe being a stripe that does not include a logical block used by the file system;

first data regeneration means for regenerating data stored in an area where the trouble is detected, by use of the RAID, in a case where the stripe including the area where the local trouble is detected is determined as being the first stripe and where the disk drives of the disk array, other than the disk drive where the trouble is detected, are operating normally; and second data regeneration means for regenerating data stored in the area where the trouble is detected, by use of a fixed data, in a case where the stripe including the area where the local trouble is detected is determined as the second stripe.

8. The method according to claim 4, further comprising:

generating redundancy data in response to the specified stripe being determined as the second stripe, said redundancy data being generated based on a write data designated by the data write request and a predetermined fixed data; and writing the write data, the fixed data and the generated redundancy data in corresponding areas of the specified stripe.

* * * * *

UNITED STATES PATENT AND TRADEMARK OFFICE
CERTIFICATE OF CORRECTION

PATENT NO. : 6,772,286 B2  
DATED : August 3, 2004  
INVENTOR(S) : Sasamoto et al.

It is certified that error appears in the above-identified patent and that said Letters Patent is hereby corrected as shown below:

Column 16,  
Lines 16 and 63, change "disk arrays," to -- disk array, --.

Column 20,  
Line 8, change "claim 4," to -- claim 1, --.

Signed and Sealed this

Twenty-first Day of December, 2004

JON W. DUDAS  
*Director of the United States Patent and Trademark Office*